United States Patent [19]
Henault

[11] 3,820,327
[45] June 28, 1974

[54] TEMPERATURE REGULATOR FOR A CATALYTIC REACTOR

[75] Inventor: Claude Henault, Billancourt, France

[73] Assignees: Regie Nationale Des Usines Renault, Billancourt; Automobiles Peugeot, Paris, both of, France

[22] Filed: May 10, 1972

[21] Appl. No.: 252,067

[30] Foreign Application Priority Data
July 6, 1971 France .............................. 71.24600

[52] U.S. Cl. ...................... 60/286, 60/298, 60/299
[51] Int. Cl. ...................... F02b 75/10, F01n 3/10
[58] Field of Search ............ 60/286, 289, 298, 290, 60/291, 307; 23/277 C, 288 F, 288 H, 288 K

[56] References Cited
UNITED STATES PATENTS

| | | | |
|---|---|---|---|
| 2,036,556 | 4/1936 | Tomlinson .......................... | 60/317 X |
| 2,138,001 | 11/1938 | Fluor ................................. | 60/321 X |
| 3,300,964 | 1/1967 | Knopp ................................. | 60/307 |
| 3,475,905 | 11/1969 | Wilford ............................. | 60/292 X |
| 3,665,711 | 5/1972 | Muroki ................................. | 60/286 |
| 3,704,592 | 12/1972 | Panhard .............................. | 60/290 |
| 3,747,346 | 7/1973 | Onoda et al. ......................... | 60/286 |

Primary Examiner—Carlton R. Croyle
Assistant Examiner—Robert E. Garrett
Attorney, Agent, or Firm—Stevens, Davis, Miller & Mosher

[57] ABSTRACT

Device for regulating the temperature of a catalytic reactor for the depollution of the exhaust gases in internal combustion engines.

Cooling of the exchange surfaces of the reactor by a flow of air the flow-rate of which is substantially proportional to the increase in temperature of the reactor, the said flow being interrupted when the temperature drops below a predetermined level. Means responsive to the reactor temperature control the regulation of the cooling air flow.

The catalytic depollution of exhaust gases of internal combustion engines.

2 Claims, 1 Drawing Figure

TEMPERATURE REGULATOR FOR A CATALYTIC REACTOR

The present invention relates to a device for regulating the temperature of a catalytic reactor for the purification of exhaust gas on internal combustion engines.

It is known that such reactors function only from a predetermined temperature on, this being the temperature at which the catalytic reaction is initiated, and must not exceed a limit temperature beyond which the catalyst would be destroyed.

Now, at high running speeds, the increase in the exhaust gas temperature on the one hand and the increase in the temperature due to the catalytic combustion itself may result in the said maximum temperature being exceeded.

The attempt has been made to remedy these disadvantages by injecting cooling air upstream of the catalytic reactor into the exhaust gas flow.

A device is also known wherein the exhaust gases are automatically deflected through a heat exchanger upstream of the reactor, to be cooled there, when the critical temperature has been reached.

These solutions have the disadvantage that they are costly and that, in time, they function in a haphazard manner, since the mechanical means for regulating the flow rate are not able to satisfactorily withstand the action of the exhaust gas atmosphere. Furthermore, the injection of cooling air tends to set up counterpressures which are detrimental to the satisfactory functioning of the engine, and also thermal shocks in the reactor which will accelerate the destruction thereof. Additionally, such a process, wherein the mixture contains an excess of oxygen is incompatible with the use of reactors providing for a reduction in the nitrogen oxides.

The present invention relates to a device for regulating the temperature of a catalytic action reactor for the antipollution treatment of the exhaust gases of an internal combustion engine, characterised in that there travels over the external surface of the reactor a cooling air flow the flow-rate of which is substantially proportional to the increase in temperature of the said reactor, the said flow being interrupted when the reactor temperature is below the temperature necessitating cooling, and reactor-temperature-responsive means providing for monitoring or controlling the flow-rate of the cooling air.

The cooling air circulation casing then acts, when the air flow is interrupted, in the manner of an insulating casing limiting the cooling by convection of the reactor, and thus promoting the increase in temperature thereof, notably on cold-starting.

According to a first embodiment of the invention, the cooling air flow is produced by the engine fan, propelling the air sucked through the radiator into a circulation casing surrounding the catalytic reactor, means for controlling the cooling air flow, which said means are subordinate to the reactor temperature, being disposed in a circulation casing, upstream of the reactor.

For this purpose, there will advantageously be employed the expansion of the reactor itself for triggering, by means of an appropriate link rod system, the open position of a flap in the cooling air inlet casing, the closure position of the said flap opening an aperture in the casing through which the air coming from the radiator is projected into the ambient atmosphere. The reactor is rigidly connected at its upstream end to the articulated flap and is fast with the cooling casing at its downstream end, whilst remaining free for movement in translation lengthwise of its axis over its entire length. The length thereof, in the cold state and when functioning, may amount to as much as several millimetres, and these differences are sufficient to provide, through the agency of a corresponding rigid link rod system, for example of the eccentric type, an opening angle of the flap which is proportional to such expansion.

In addition to its extreme simplicity and its ruggedness, the present device has the advantage of being practically incapable of being put out of order; the mechanical portion thereof is located in the ambient atmosphere of the engine compartment and not, as in known systems, within the exhaust gas flow.

The temperature differences in the cooling air are automatically corrected, due to the fact that the temperature acts also on the sheet metal of the reactor and on that of the cooling casing, thereby annulling their lengthwise variations of atmospheric order.

However, it has been found that the fact that the cooling air flow is produced with the aid of the engine van is detrimental to the ventilation of the engine compartment on the one hand and that, on the other hand, any risk of overheating the catalyst exists only when the engine is running under full load, under which conditions it discharges large quantities of exhaust gas at a high temperature. These running conditions correspond to a predetermined velocity of the vehicle.

Thus, in a second embodiment of the device according to the invention, the said velocity is made use of in order to effect, due to the air circulation produced by the said velocity, the cooling of the catalytic reactor. To this end, the cooling air casing is formed with an aperture oriented forwardly of the vehicle and controlled by an articulated flap the degree of opening of which regulates the air flow-rate.

Still according to the said second embodiment, the sensitivity of regulation of the degree of opening of the inlet flap in the cooling air circulation casing is increased by utilising electromechanical means controlled by a thermocouple situated in the zone of highest temperature of the catalyst.

Finally, in the said second embodiment, in order to diminish the temperature gradients within the catalyst and to increase the cooling effect, there is advantageously employed a catalytic reactor taking the form of a sleeve disposed longitudinally in the cooling casing. This arrangement increases the cooling air exchange surface and decreases the thickness of the catalytic mass.

The description given hereinbelow, with reference to the accompanying drawings which are given purely by way of non-limitative example, will show clearly how the invention may be carried into effect.

Figure 1:
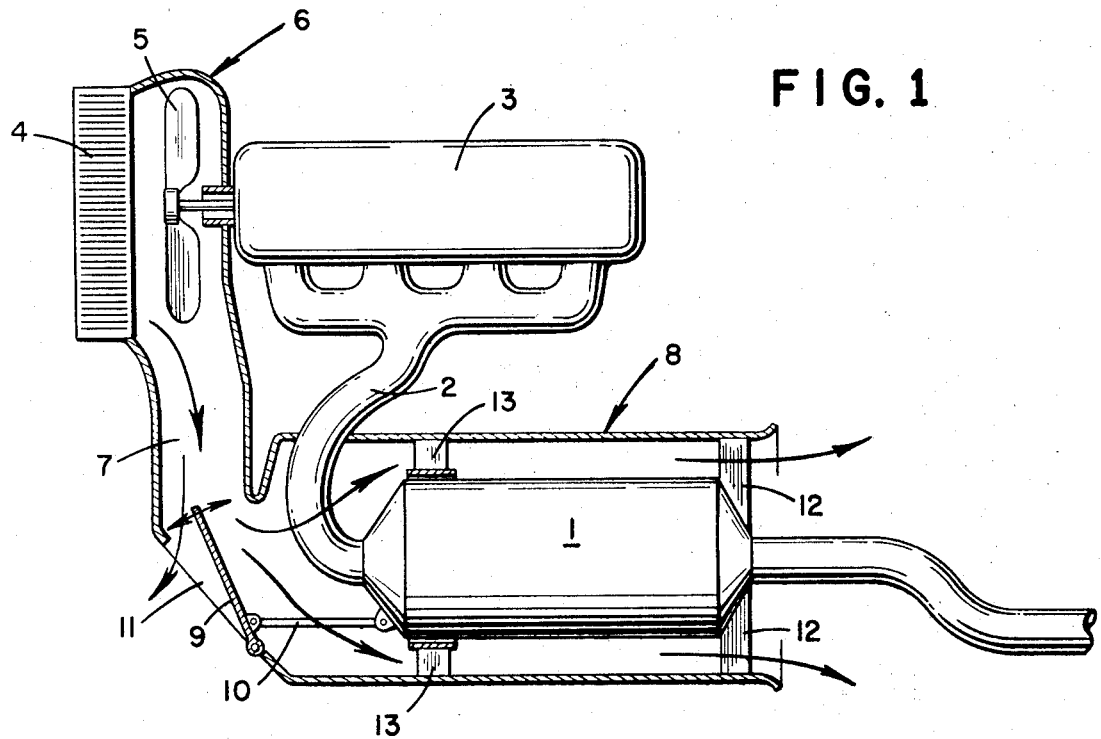
FIG. 1 shows, diagrammatically and in section, a first embodiment of the cooling device according to the invention for a catalytic reactor.

Referring to FIG. 1, this figure shows a catalytic reactor 1 connected to the exhaust pipe 2 of an engine 3.

Disposed before the engine, in conventional manner, is a radiator 4 having its fan 5 surrounded by a casing 6 recovering the air aspired by the said fan through the radiator and projecting the said air through a conduit 7 into a cooling casing 8 surrounding the catalytic reactor 1.

A flap 9, controlled by a link rod system 10 connected to the reactor 1, regulates the flow of cooling air at the inlet of the casing 8, the air excess supplied by the radiator 5 escaping to the atmosphere directly through the aperture 11.

Fins (not shown) may be provided at the periphery of the reactor 1, so as to increase the exchange surface thereof. The reactor 1 is fast with the casing 8 by ribs 12 at its downstream end, whereas its upstream end slides freely in a guide 13 fast with the casing 8.

In functioning, on cold-starting being effected, the flap 9 will be in the closed position. All the cooling air routed by the casing 7 will be rejected into the atmosphere through the aperture 11. The absence of air circulation in the casing 8 will afford supplementary relative insulation at the reactor 1 which will acquire proportionately more rapidly the normal-running temperature.

The heating thereof will result in the expansion of its structure, which said expansion will be entirely transmitted forwardly by the guide system 13 to the link rod system 10, proceeding from the rigid rear securing location 12 thereof. Such expansion will progressively bring about the opening of the flap 9 and a cooling air circulation will be established in the casing 8.

Under the full running load, the aperture 11 will be closed by the flap 9, the reactor 1 having attained its maximum functioning expansion. To the air "pulsed" by the fan there will be added the air "absorbed" by the engine speed, proportionately increasing the pressure and the flow rate of the cooling air and preventing the reactor 1 from reaching a critical temperature by providing for the evacuation of its supplementary thermal flow.

Such a regulation device will be particularly effective when employed with catalytic reactors having metallic elements the calorific inertia of which is low. An air/exhaust gas heat exchanger may also be disposed in the cooling casing upstream of the catalytic reactor so as to limit the maximum temperature of the exhaust gases before entry thereof into the catalytic reactor.

Figure 2:
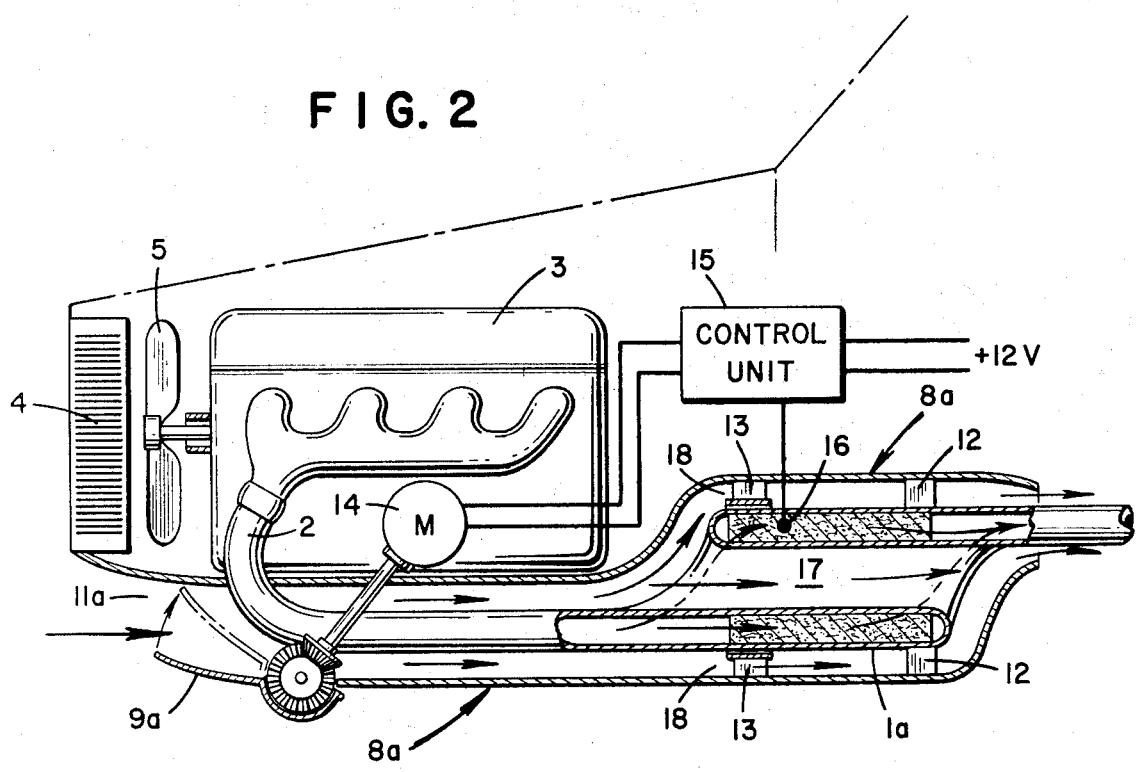
FIG. 2 shows, diagrammatically and in section, a second embodiment of the cooling device according to the invention.

Referring to FIG. 2, this figure shows a catalytic reactor 1a connected to the engine 3 by an exhaust pipe 2. The radiator 4 and the fan 5 are mounted in conventional manner forwardly of the motor 3, to provide for the conventional ventilation of the engine compartment.

The catalytic reactor 1a is mounted, as in the first embodiment, in a cooling ventilation casing 8a, by means of fixed ribs 12 and a sliding guideway 13. The inlet aperture 11a in the casing 8a is controlled by the position of a mobile flap 9a the opening regulation of which is effected by an electric motor 14, controlled by a control unit 15, controlled by a thermocouple 16 situated within the catalyst, according to a per se known arrangement. The elements 14, 15 and 16 are part of conventional and inexpensive electrical arrangements such as are utilised in automobile construction electrical accessories.

In operation, as soon as the temperature of the catalyst exceeds a limit value, the thermocouple 16 trips the control unit 15 which starts up the engine 14 and opens the flap 9a. An air flow induced due to the speed of the vehicle flows through the cooling casing 8a and, at the level of the reactor 1a, is divided into a central flow 17 and a peripheral flow 18.

What we claim is:

1. A device for regulating the temperature in a catalytic reactor for the depollution of the exhaust gas in internal combustion engines comprising cooling air casing means to direct the flow of air over the exchange surfaces of said reactor to cool the reactor;

means to provide a flow of air to said cooling air casing means; and control means responsive to the temperature of the reactor to control the regulation of the cooling air flow into said cooling air casing means whereby the flow of air is substantially proportional to the increase in temperature of the reactor; said control means comprising a flap at the opening of said cooling air casing which is controlled by a link rod system connected to the upstream end of the catalytic reactor, said reactor being rigidly connected at its downstream end to the cooling air casing, said upstream end of said catalytic reactor being adapted to slide freely in a guide support fast with said casing whereby the thermal expansion of said reactor regulates the degree of opening of said flap.

2. A device according to claim 1, wherein said catalytic reactor is in the form of a sleeve disposed longitudinally in said cooling air casing.

* * * * *